United States Patent [19]

Stevenson et al.

[11] 4,015,291
[45] Mar. 29, 1977

[54] FLYING HEAD HELICAL SCAN MAGNETIC RECORDING DEVICE EMPLOYING A LOBED ROTOR

[75] Inventors: Peter Alan Stevenson, Stephen Martin Vogel, both of Boulder, Colo.

[73] Assignee: International Business Machines Corporation, New York, N.Y.

[22] Filed: Sept. 3, 1975

[21] Appl. No.: 609,915

[52] U.S. Cl. .............................. 360/102; 360/130
[51] Int. Cl.$^2$ ................... G11B 5/60; G11B 21/20; G11B 15/64
[58] Field of Search .......... 360/102, 128, 129, 130, 360/84, 85

[56] References Cited

UNITED STATES PATENTS

| | | | |
|---|---|---|---|
| 3,510,604 | 5/1970 | Kell | 360/102 |
| 3,872,507 | 3/1975 | Sand et al. | 360/102 |
| 3,902,192 | 8/1975 | Laenen et al. | 360/102 |
| 3,939,493 | 2/1976 | Fowler et al. | 360/102 |

*Primary Examiner*—Robert S. Tupper

[57] ABSTRACT

A flying head, helical scan magnetic recording device comprises a tape source, a mandrel for supporting a helical wrap of magnetic tape, a rotor which is lobed with respect to the mandrel axis and a tape sink. The lobed rotor carries one or more magnetic heads at substantially the peak of the lobe around a flying scan path in non-contact, microinch adjacency to the magnetic tape supported on the mandrel. The major portion of the rotor, however, is recessed with respect to the magnetic tape, thereby minimizing the tendency of the tape to shear off the air bearing film carried by the rotor. The result is enhanced dynamic air bearing support of the tape in the immediate vicinity of the flying head.

9 Claims, 6 Drawing Figures

FLYING HEAD HELICAL SCAN MAGNETIC RECORDING DEVICE EMPLOYING A LOBED ROTOR

BACKGROUND OF THE INVENTION

1. Field of the Invention

This invention relates to an improved helical scan magnetic recording device. More particularly, it relates to a flying head helical scan recording device which is provided with a lobed rotor for enhancing the dynamic air bearing in the vincinity of the rotating head.

2. History of the Art

The desirability of recording and replaying high speed information signals from television and from high speed digital computers has resulted in increasingly sophisticated magnetic recording devices. Conventional longitudinal scan magnetic recording devices are adequate to record and replay relatively low frequency signals in the audio range. But such devices are not adequate for recording information signals in the video frequency range because it is not practical to drive them to the high linear tape speeds required for use at such frequencies.

As disclosed in U.S. Pat. No. 2,773,120 issued to E. E. Masterson, helical scan magnetic recording devices overcome the necessity for high linear tape speeds. A typical helical scan device comprises a relatively wide magnetic tape, a pair of cylindrical support mandrels, a rotor and a magnetic head (recording or replaying) disposed upon the rotor. The mandrels are axially aligned and positioned end-to-end with a slight gap between them, and the rotor is aligned on the common mandrel axis to rotate in the gap between the two mandrels.

In operation, the wide magnetic tape is wrapped helically about the support mandrels with its edges abutted across the gap between the cylinders, and the rotor carries the magnetic head around the gap to scan a diagonal track on the tape. In such a device, the rotor speed can greatly exceed the tape speed, thereby permitting greatly increased scanning rates.

Although a variety of improvements have been made in the basic helical scan magnetic recording device, excessive wear of the tape and magnetic head remains one of the most serious problems in high-speed devices. Tape wear due to frictional contact between the tape and the cylindrical mandrels has been minimized by the provision of various types of air film bearings between the mandrels and the tape. For example, U.S. Pat. No. 3,139,489, issued to R. T. Lamb, discloses the provision of an air film bearing by the introduction of pressurized air between the mandrel and the tape. Alternatively, U.S Pat. Nos. 3,333,753 and 3,404,241 provide dynamic air film bearings by rotating one or more of the mandrels. The rotating mandrel drags air under the tape, and this air forms a lubricating film.

As may be readily appreciated, a major problem in a high speed helical scan recording device is the interaction between the magnetic tape and the rapidly moving magnetic head. In devices using contact heads, the rotating head tends to drive ripples through the surface of the tape both ahead of it and behind it and to produce excessive wear. U.S. Pat. No. 3,247,329 issued to Yasho Tomita purports to alleviate the ripple problem by the provision of guide wenders on either side of the magnetic head for elevating the tape into straight-line contact with the head. This provision does not, however, solve the basic problem in contact devices, namely that of wear.

The problem of minimizing wear between the tape and the magnetic head has led to the development of flying head recording devices in which the magnetic head need not contact the tape in order to read or record. Rather the magnetic head is designed to "fly" in close, non-contact adjacency (50 microinches or less) to the tape during the predominant portion of its scanning cycle. In such devices the spacing between the tape and the head is critical. Relatively small perturbations in the tape support can cause the tape to travel beyond the sensing range of the head or to crash onto it.

One approach to providing the augmented tape stability required for flying head helical scan recording devices involves providing the rotor with an air bearing film. U.S. Pat. No. 3,840,894 issued to P. J. Arseneault, for example, describes an arrangement wherein the rotor is wide compared to the width of the magnetic head and is provided with an air bearing to provide a stable platform for the magnetic tape along the path of the rotating head.

A second approach to providing augmented tape stability involves the use of a precisely shaped rotor which protrudes beyond the support mandrels to provide a dynamic air bearing and to cause the tape to be locally stressed in the longitudinal region surrounding the magnetic head. U.S. Pat. Application Ser. No. 488,341, filed July 15, 1974, by G. W. Baumann et al., and assigned to applicants' assignee, discloses such an arrangement wherein a constant radius rotor protruding radially beyond the mandrel ends aerodynamically stresses the tape and yet permits the head to fly in microinch adjacency to it.

SUMMARY OF THE INVENTION

The present inventors have recognized that conventional flying head helical scan recording devices deteriorate the dynamic air film bearing generated by the rotation of the rotor. While rapidly rotating bodies generate an air film bearing by dragging a thin film of air in the direction of rotation, the air film generated by the rotor of a conventional flying head recording device is in large part sheared off by the edge of the magnetic tape at the line where the rotor enters under it. This degradation of the bearing increases the tendency of the head and tape to abrade at the line of entry, reduces the effectiveness of the air film support in the critical region under the head and introduces instabilities in the tape at the line where the rotor exits from under the tape.

In accordance with the invention, the problems resulting from shearing are alleviated by providing a flying head, helical scan recording device with a lobed rotor. Specifically, a flying head, helical scan magnetic recording device comprises a tape source, a mandrel for supporting a helical wrap of magnetic tape, a rotor which is lobed with respect to the mandrel axis, and a tape sink. The lobed rotor carries one or more magnetic heads substantially at the peak of the lobe (i.e., at the region of radial displacement from the mandrel axis extending radially beyond the mandrel surface) around a flying scan path in non-contact, microinch adjacency to the magnetic tape supported on the mandrel. The major portion of the rotor however, is recessed with respect to the magnetic tape, thereby minimizing the tendency of the tape to shear off the air bearing film carried by the rotor. The result is enhanced dynamic air bearing support in the immediate vicinity of the flying head.

BRIEF DESCRIPTION OF THE DRAWINGS

The nature, advantages, and various features of the invention will appear more fully upon consideration of the illustrative embodiments now to be described in detail in connection with the accompanying drawings.

In the drawings.

DETAILED DESCRIPTION OF THE DRAWINGS

Figure 1:
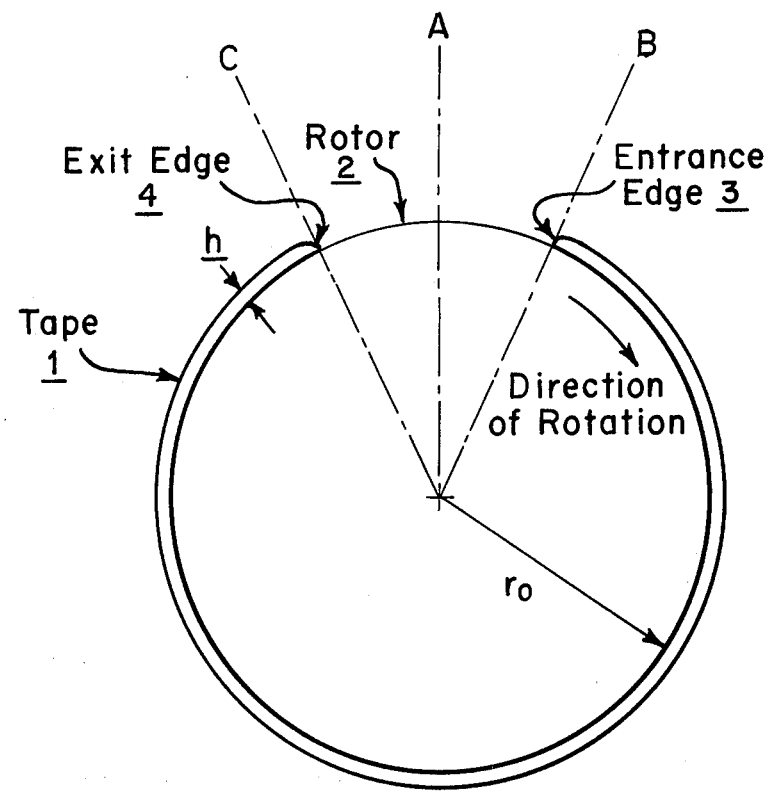
FIG. 1 is a schematic cross section of a conventional rotor which illustrates the nature of air film shearing and the problems it causes.

Referring to the drawings, FIG. 1 schematically illustrates the problem of air film shearing in prior art flying head devices. Specifically, the Figure shows a cross-section of a strip of magnetic tape 1 supported at an exaggerated height, $h$, above a moving circular rotor 2. The tape has entrance and exit edges 3 and 4, respectively, past which rotor 2 enters under the tape and exits from under the tape. In general, the periphery of the moving rotor will drag with it sufficient air to form a dynamic bearing supporting the tape at a height, $h$, above the rotor periphery, which height is approximately given by the formula:

$$h = 0.642 \, r_o \left[ \frac{6MS}{T} \right]^{2/3},$$

where $r_o$ is the radius of the rotor, M is the viscosity of air, S is the speed of the surface of the rotor, and T is the tape tension.

Figure 2A:
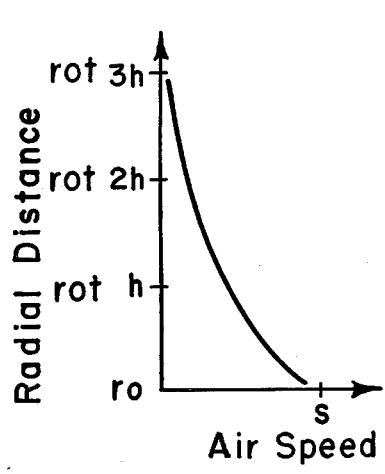
FIGS. 2a, 2b and 2c are schematic air speed distribution diagrams illustrating the effect of shearing on the air bearing of the FIG. 1 rotor.

The nature of this dynamically generated air film may be seen by reference to FIG. 2a which qualitatively depicts the air speed as a function of position radially beyond the rotor surface along radial line A in FIG. 1. In substance, the air adjacent to the rotor has a speed substantially equal to that of the periphery of the rotor, and the air speed rapidly decreases with increasing radial distance from the rotor periphery.

Figure 2B:
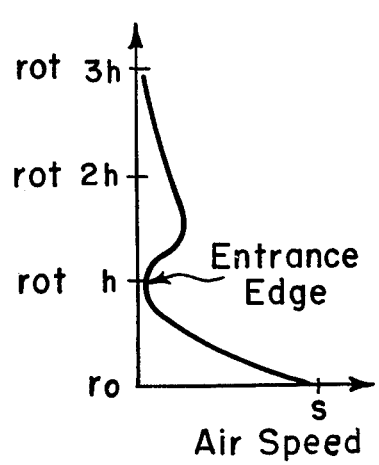

The entrance and exit edges of the tape tend to droop nearer the rotor than the bulk of the tape body and to shear off a substantial portion of the hydrodynamic air bearing. This may be visualized by reference to the air speed diagram of FIG. 2b which depicts the air speed distributions above and below the shearing edge along the radial line where the rotor enters under the tape (line B of FIG. 1). As a consequence of this shearing, the amount of air available to provide support for the tape is substantially reduced.

Figure 2C:
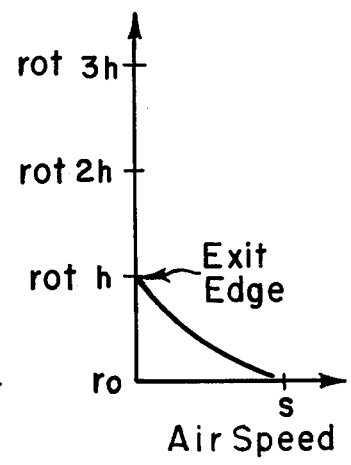

In addition, as the rotor exits from under the tape, it encounters a new environment where air is readily available. The air speed distribution depicted in FIG. 2c along the radial line of exit (line C of FIG. 1), is not the equilibrium distribution for the new environment. As may be seen by comparing FIGS. 2a and 2c, a new equilibrium air speed distribution must be achieved, and the forces effecting this equilibrium change, combined with the elasticity of the tape, can create vibrations in the tape beginning at exit edge 4.

Applicants have determined that the problems presented by the shearing of the air bearing in a high speed, flying head helical scan recording system can be overcome by providing a lobed rotor carrying one or more magnetic heads at substantially the peak of the lobe.

Figure 3:
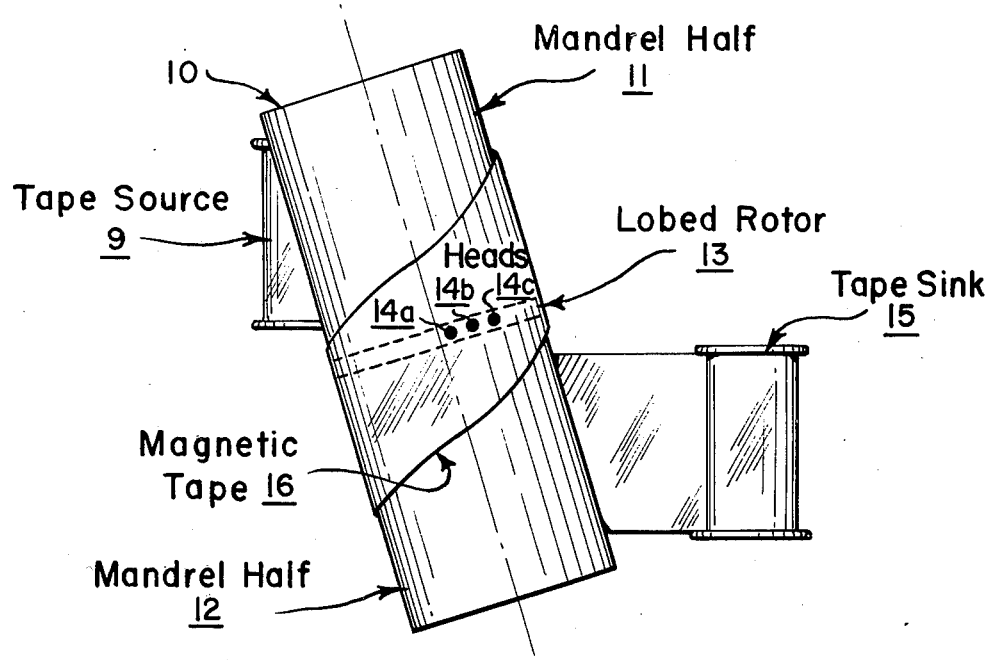
FIG. 3 is a view of an improved helical scan recording device utilizing a lobed rotor in accordance with the invention.

FIG. 3 illustrates an improved helical scan recording device employing a lobed rotor in accordance with the invention. The device comprises, in substance, a tape source 9; a tape support mandrel 10, preferably comprising a pair of axially aligned mandrel halves 11 and 12; a lobed rotor 13 carrying one or more magnetic heads 14a, 14b and 14c, each comprising a magnetic transducer, at substantially the peak of the lobe; and a tape sink 15. In the preferred arrangement, rotor 13 is disposed between adjacent ends of aligned mandrel halves 11 and 12; and magnetic heads 14a, 14b and 14c are read, write and erase heads, respectively. A length of magnetic tape 16 is shown entering the device from tape source 9, helically winding around mandrel halves 11 and 12 so that it overlies rotor 13, and exiting into tape sink 15.

Tape source 9 typically comprises a supply spool and preferably includes edge guiding means (not shown) for guiding the tape onto the mandrel halves at a predetermined angle with respect to the aligned mandrel axes, and it may include compliant guiding means (not shown) for minimizing tension disturbances. Such compliant guiding means are described in U.S. Pat. No. 3,850,358 issued to M. L. Nettles on Nov. 26, 1974.

Mandrel halves 11 and 12 are preferably provided with an air bearing for supporting tape 16. This air bearing may be produced by forcing air through a porous or perforated mandrel surface, as described, for example, in U.S. Pat. No. 3,488,455 issued to Sashoua et al. Alternatively, the air bearing may be aerodynamically produced by rotating the mandrels as described, for example, in U.S. Pat. No. 3,333,753 issued to J. H. Streets. In the latter alternative arrangement, the rotor may be attached to one of the mandrel halves.

The tape sink 15 is typically a capstan or a combination capstan and take-up spool. Like the source, it can be advantageously provided with compliant edge guiding means (not shown) for receiving tape from the mandrel halves at a predetermined angle and compliant guiding means (not shown) for minimizing tension disturbances.

Figure 4:
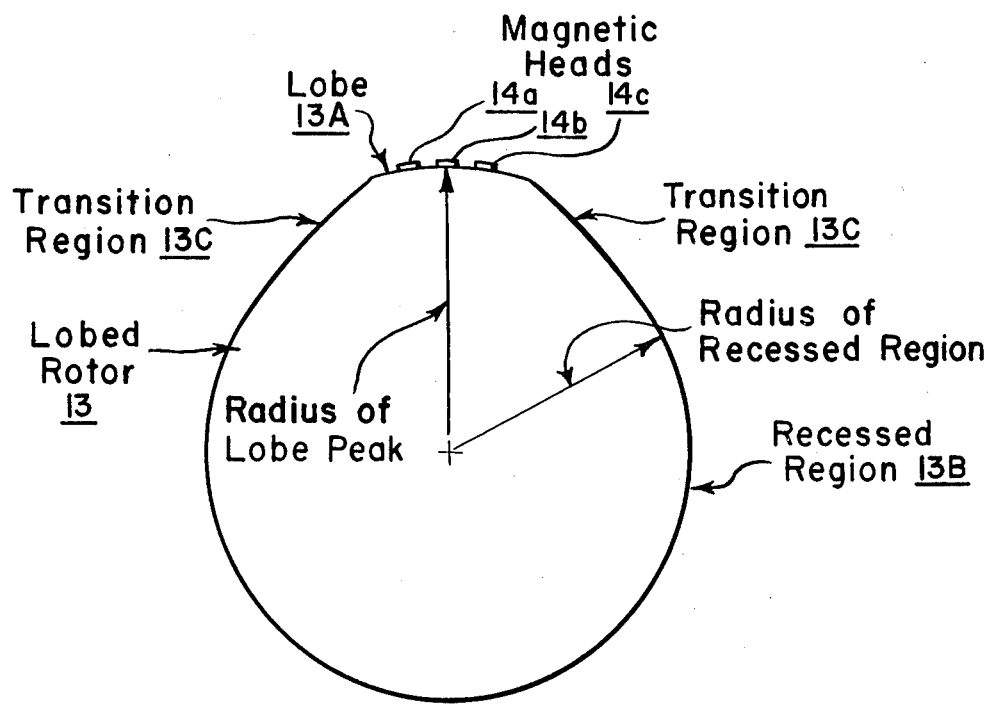
FIG. 4 is a view of a portion of the apparatus of FIG. 1 showing a cross-section of a typical lobed rotor in accordance with the invention.

As better illustrated in FIG. 4, lobed rotor 13, differs from a conventional rotor in that its periphery consists of two regions, a lobe 13A for carrying magnetic head 14 in flying, microinch adjacency to the magnetic tape, and a recessed region 13B, comprising the major portion of the periphery, for rotating in aerodynamically decoupled relationship with the magnetic tape. In order to achieve this decoupled relationship, the recessed portion of the rotor is radially inwardly recessed from the lobe peak towards the mandrel axis. The amount of the recession is at least equal to the distance which the tape, in the absence of a rotor between the two mandrel halves, would sag radially inwardly towards the rotor gap between the halves. In typical applications, this amount of recession will exceed about 0.75 thousandths of an inch. Continuous, smooth transition regions 13C are provided between the peak region and the recessed region in order to preclude turbulence and violent air motion.

The heads 14a, 14b and 14c, are carried on the rotor at substantially the peak of eccentricity, i.e., they are carried on that portion of the rotor which extends radially beyond the adjacent mandrel. In typical applications wherein the tape is supported above the outer periphery of support mandrel halves 11 and 12 of FIG. 3 by air bearing films associated with the halves, the lobed rotor will carry the head at a radius greater than that of the mandrel halves in non-contact, microinch adjacency to the supported tape.

The longitudinal dimension of the rotor 13 can be comparable in magnitude to that of magnetic heads 14a, 14b, and 14c and it can have a crown or arc-shaped axial cross-section such as is described in U.S. Pat. application Ser. No. 488,341, identified above. Alternatively, the longitudinal dimension of the rotor can be large compared with the longitudinal dimension of the magnetic heads; and the rotor can be provided with an air permeable surface (i.e., porous or perforated) in order to permit the passage of pressurized air therethrough, thereby permitting the use of a supplemental air bearing such as is described in U.S. Pat. No. 3,840,894.

Rotor 13 is typically connected to a motor (not shown) for driving it at a constant speed which is sufficiently large to generate an aerodynamic air film bearing around the rotor periphery.

In the operation of the helical scan recording device rotor 13 turns at relatively high speed, thereby moving the magnetic heads in non-contact, microinch adjacency to tape 16 along a track which is slanted with respect to the length of the tape. Because of the lobed shape of the rotor, there is substantially no interaction between the edge of the tape and the aerodynamic air bearing adjacent the recessed portions. In contrast with the operation of conventional rotor devices, the edge of the tape does not shear off a significant portion of the air bearing at the line of entry under the tape. Instead, as the lobe peak approaches entry under the tape, the tape is provided with a gradually increasing amount of air bearing support by transition region 13C, and as the peak exits from under the tape, the support gradually decreases.

The advantages of this device are manifold. First, a substantially increased quantity of moving air is provided in the critical vicinity of the moving heads, and particularly at the point of entry under the tape. This moving air provides enhanced support for the tape, thereby reducing both head wear and tape wear, particularly at the edges. Second, this rotor structure utilizes a substantially smaller critical surface area than do conventional rotors. Unlike conventional rotors which must be precisely machined about their 360° circumferences, lobed rotors need only be precisely machined in the critical region near the magnetic heads and in a smooth transition region. The major portion of the periphery does not interact with the tape. Third, the lobed rotor, by providing an augmented quantity of air in the vicinity of the heads, reduces the tendency to generate waves in the tape at the point of exit.

While the invention has been described in connection with a small number of specific embodiments, it is to be understood that these are merely illustrative of the many other specific embodiments which also utilize the principles of the invention. For example, it is clear that a single rotor can be provided with a plurality of lobes, each lobe carrying one or more magnetic heads. Thus, numerous and varied devices can be made by those skilled in the art without departing from the spirit and scope of the present invention.

We claim:

1. In a helical scan magnetic recording device of the type comprising a tape source; a mandrel having a cylinder axis for supporting a helical wrap of magnetic tape at a substantially constant radial distance from said axis; a rotor positioned along said axis at a location radially within said helical wrap of tape for carrying about said axis at least one magnetic head in scanning adjacency to said tape along a path which is slanted with respect to the length of said tape; means for generating an air bearing for supporting said tape above said rotor; and a tape sink, the improvement wherein said rotor has a periphery characterized by:
   a. at least one lobe peak comprising a circumferential region of maximum radial displacement from said axis extending radially beyond the mandrel surface for carrying at least one mandrel head; and
   b. a recessed circumferential region which is recessed radially inwardly towards said axis by a distance sufficient to substantially preclude aerodynamic interaction between the recessed region of the rotor periphery and said magnetic tape.

2. A device according to claim 1 wherein said recessed region of said rotor comprises the major portion of the periphery of said rotor.

3. A device according to claim 1 wherein:
   the radial distance of said lobe peak measured from said mandrel axis is at least equal to the radial distance from said axis to the tape supported on said mandrel, whereby said magnetic head is caused to fly in non-contact, microinch adjacency to said magnetic tape;
   said rotor is coupled to means for rotating it around said axis with sufficient velocity to generate an aerodynamic air bearing film around its periphery; and
   said recessed portion of the periphery of said rotor is recessed with respect to said supported tape by an amount sufficient to preclude interaction between said air bearing film and said tape except in the region adjacent to said lobe peak.

4. A device according to claim 1 wherein:
   said mandrel comprises a pair of mandrel halves aligned along the mandrel axis, said halves comprising circular cylinders having a substantially equal common external radius;
   said mandrel halves are provided with means for generating air bearing films for supporting said magnetic tape at a substantially constant radius in excess of the common external radius of said mandrel halves; and
   the radius of said lobe peak is chosen to carry said magnetic head about said axis at a radial distance in excess of the common external radius of said mandrel halves.

5. A device according to claim 1 wherein said recessed region is recessed radially inwardly by at least 0.75 thousandths of an inch.

6. A device according to claim 1 wherein said lobe peak of said rotor is peripherally connected to said recessed region by a gradual transition region for providing gradually increasing air bearing support for the tape as the lobe peak approaches entrance under the tape and gradually decreasing support as the lobe peak exits from under the tape.

7. A device according to claim 6 wherein said recessed region comprises the major portion of the periphery of said rotor.

8. A device according to claim 6 wherein said lobe peak of said rotor is peripherally connected to said recessed region by gradual transition regions.

9. A device according to claim 6 wherein said rotor is provided with an air permeable outer surface for permitting the passage of pressurized air therethrough.

* * * * *

UNITED STATES PATENT AND TRADEMARK OFFICE
CERTIFICATE OF CORRECTION

PATENT NO. : 4,015,291
DATED : March 29, 1977
INVENTOR(S) : Peter Alan Stevenson & Stephen Martin Vogel It is certified that error appears in the above-identified patent and that said Letters Patent are hereby corrected as shown below:

Column 6, line 21, change "mandrel" to -- magnetic --

Signed and Sealed this

Fourteenth Day of June 1977

[SEAL]

Attest:

RUTH C. MASON
*Attesting Officer*

C. MARSHALL DANN
*Commissioner of Patents and Trademarks*